(12) United States Patent
Lipkin et al.

(10) Patent No.: US 11,103,964 B2
(45) Date of Patent: Aug. 31, 2021

(54) SERVICE APPARATUS FOR USE WITH ROTARY MACHINES

(71) Applicant: General Electric Company, Schenectady, NY (US)

(72) Inventors: Don Mark Lipkin, Niskayuna, NY (US); Todd William Danko, Niskayuna, NY (US); Mark John Zajkowski, Austerlitz, NY (US)

(73) Assignee: General Electric Company, Schenectady, NY (US)

( * ) Notice: Subject to any disclaimer, the term of this patent is extended or adjusted under 35 U.S.C. 154(b) by 242 days.

(21) Appl. No.: 16/212,102

(22) Filed: Dec. 6, 2018

(65) Prior Publication Data
US 2020/0180084 A1 Jun. 11, 2020

(51) Int. Cl.
*G06F 17/00* (2019.01)
*B23P 6/00* (2006.01)
(Continued)

(52) U.S. Cl.
CPC ............... *B23P 6/002* (2013.01); *B25J 1/02* (2013.01); *B25J 11/005* (2013.01); *F01D 25/00* (2013.01);
(Continued)

(58) Field of Classification Search
CPC .... B23P 6/002; B23P 23/04; B25J 1/02; B25J 11/005; F01D 25/00; F01D 5/005;
(Continued)

(56) References Cited

U.S. PATENT DOCUMENTS

| | | | | |
|---|---|---|---|---|
| 4,659,195 A | * | 4/1987 | D'Amelio | F01D 21/003 359/503 |
| 4,735,501 A | * | 4/1988 | Ginsburgh | G02B 23/2476 356/241.1 |

(Continued)

FOREIGN PATENT DOCUMENTS

KR 2014068446 A 6/2014

OTHER PUBLICATIONS

Automated visual inspection of aircraft engine combustor assemblies, Proceedings. 1986 IEEE International Conference on Robotics and Automation, Pai et al., Apr. 7-10, 1986, pp. 1919-1924.
(Continued)

*Primary Examiner* — Ronnie M Mancho
(74) *Attorney, Agent, or Firm* — Dority & Manning, P.A.

(57) ABSTRACT

A system for use in maintaining a turbine assembly includes a plurality of blades and a plurality of vanes. The system includes an insertion apparatus including an insertion end, a steering end opposite the insertion end, and a body extending from the insertion end to the steering end. The insertion end is positionable proximate at least one blade of the plurality of blades using a steering interface. The system also includes a service apparatus for use in maintaining the turbine assembly. The service apparatus includes at least one maintenance device and an anchoring feature. The service apparatus is proximate the insertion end of the insertion apparatus and is positionable in a plurality of orientations via the steering interface. The anchoring feature is configured to releasably couple the service apparatus to at least one blade of the plurality of blades.

18 Claims, 7 Drawing Sheets

(51) Int. Cl.
  *B25J 1/02*  (2006.01)
  *B25J 11/00*  (2006.01)
  *F01D 25/00*  (2006.01)

(52) U.S. Cl.
  CPC ...... *F05D 2220/32* (2013.01); *F05D 2260/80* (2013.01)

(58) Field of Classification Search
  CPC .. F01D 21/003; F01D 25/002; F05D 2220/32; F05D 2260/80; F05D 2230/72; G01M 15/14; G01M 13/00
  USPC ...................................................... 73/865.8
  See application file for complete search history.

(56) References Cited

U.S. PATENT DOCUMENTS

| | | | |
|---|---|---|---|
| 4,794,912 A * | 1/1989 | Lia | A61B 1/0053 600/152 |
| 4,989,581 A * | 2/1991 | Tamburrino | A61B 1/0055 600/103 |
| 5,066,122 A * | 11/1991 | Krauter | G02B 23/2476 356/241.4 |
| 7,017,431 B2 | 3/2006 | King et al. | |
| 8,400,501 B2 | 3/2013 | Heyworth et al. | |
| 8,602,722 B2 | 12/2013 | George et al. | |
| 9,322,332 B2 | 4/2016 | Kell et al. | |
| 9,581,440 B2 | 2/2017 | Ruhge et al. | |
| 9,879,981 B1 * | 1/2018 | Dehghan Niri | G01M 5/0091 |
| 2004/0216468 A1 * | 11/2004 | Hatcher | F25B 9/04 62/5 |
| 2007/0089545 A1 * | 4/2007 | Roney, Jr. | F01D 25/00 73/865.8 |
| 2012/0312103 A1 * | 12/2012 | Hannott | F01D 21/003 73/865.8 |
| 2014/0130583 A1 | 5/2014 | Kell et al. | |
| 2017/0070686 A1 * | 3/2017 | Boudin | G02B 23/24 |
| 2017/0122123 A1 | 5/2017 | Kell et al. | |
| 2017/0234734 A1 * | 8/2017 | Sakami | G01J 5/061 359/820 |
| 2018/0003060 A1 * | 1/2018 | Lipkin | B23P 6/045 |
| 2018/0117731 A1 * | 5/2018 | Fielding | B23B 51/0054 |
| 2018/0119568 A1 * | 5/2018 | Negoescu | F01D 21/003 |
| 2019/0054638 A1 * | 2/2019 | Norton | B25J 9/1045 |
| 2019/0331612 A1 * | 10/2019 | Morris | G01N 21/954 |
| 2020/0040763 A1 * | 2/2020 | Wang | B64F 5/30 |

OTHER PUBLICATIONS

Evolutionary maintenance for aircraft engines, Annual Reliability and Maintainability. Symposium. 1999 Proceedings (Cat. No. 99CH36283), Kumar et al., Jan. 18-21, 1999, pp. 62-68.

* cited by examiner

SERVICE APPARATUS FOR USE WITH ROTARY MACHINES

BACKGROUND

The field of the disclosure relates generally to a service apparatus and, more particularly, to a service apparatus for inspecting and/or repairing rotary machines.

At least some known rotary machines, such as turbines for aircraft engines and gas and steam powered turbines for industrial applications, include an outer case and at least one rotor that carries multiple stages of rotating airfoils, i.e., blades, which rotate with respect to the outer case. In addition, the outer case carries multiple stages of stationary airfoils, i.e., guide vanes. The blades and guide vanes are arranged in alternating stages. In at least some known rotary machines, shrouds are disposed on the radially inner surfaces of a stator to form a ring seal around tips of the blades. Together, the blades, guide vanes, and shrouds define a primary flowpath inside the compressor and turbine sections of the rotary machine. This flowpath, combined with a flowpath through the combustor, defines a primary cavity within the rotary machine.

During operation, the components of the rotary machine experience at least some material degradation as a function of the components' service history. Accordingly, for at least some known rotary machines, periodic inspections, such as borescope inspections, are performed to assess the condition of the rotary machine between service intervals. Examples of conditions observed during inspections include wear (e.g., from incursion of blade tips into the shrouds, particle-induced erosion, water droplet induced erosion, wear due to sliding contact between stationary components), impact (e.g., spallation of thermal barrier coating (TBC) or environmental barrier coating (EBC) from turbine-section components, leading edge burring/bending of compressor blades), cracking (e.g., thermal fatigue, low-cycle fatigue, high-cycle fatigue, creep rupture), edge-of-contact wear between stationary parts, oxidation or hot corrosion of high-temperature metallic sections, static seal degradation, and creep deformation (e.g., of guide vane sidewalls/airfoils, blade platforms, and blade tip shrouds).

During service intervals, the rotary machines are at least partially disassembled to allow repair and/or replacement of damaged components. For example, damaged components of at least some known rotary machines are primarily repaired at overhaul or component repair facilities, with only limited intervention conducted in the field. Processes used to repair compressor and turbine flowpath components include surface cleaning to remove accumulated dirt and oxidation products, stripping and restoration of coated surfaces, crack repair, section replacement, and aero contouring and smoothing. Repairing the components during service intervals reduces the cost to maintain the rotary machine because the cost to repair components is sometimes less than the cost to replace the components. However, sometimes, the components run past their repair limits between planned service intervals. In addition, sometimes, heavily distressed components fail and cause an unplanned outage.

For at least some known rotary machines, a borescope is inserted through an opening of the rotary machine and manipulated within a primary cavity of the rotary machine for inspection. However, at least some known borescopes do not access all locations of the rotary machine. In particular, some non-rotating components in at least some known rotary machines are difficult to access with a borescope. Furthermore, damage detected during inspection is typically unmitigated until the machine is at least partially disassembled for scheduled service.

BRIEF DESCRIPTION

In one aspect, a system for use in maintaining a turbine assembly is provided. The turbine assembly includes a plurality of blades and a plurality of vanes. The system includes an insertion apparatus including an insertion end, a steering end opposite the insertion end, and a body extending from the insertion end to the steering end. The insertion end is positionable proximate at least one blade of the plurality of blades using a steering interface. The system also includes a service apparatus for use in maintaining the turbine assembly. The service apparatus includes at least one maintenance device and an anchoring feature. The service apparatus is proximate the insertion end of the insertion apparatus and is positionable in a plurality of orientations via the steering interface. The anchoring feature is configured to releasably couple the service apparatus to at least one blade of the plurality of blades.

In another aspect, a method of operating a service apparatus for use with a turbine assembly is provided. The turbine assembly includes a plurality of vanes and a rotor having a plurality of blades. The method includes positioning the service apparatus within a primary flowpath of the turbine assembly using an insertion apparatus. The insertion apparatus includes an insertion end, a steering end opposite the insertion end, and a body extending from the insertion end to the steering end. The service apparatus includes at least one maintenance device and an anchoring feature configured to releasably couple the service apparatus to at least one blade of the plurality of blades. The method also includes directing an insertion end of the insertion apparatus through the turbine assembly using a steering interface on the steering end of the insertion apparatus. The service apparatus is coupled to the insertion end of the insertion apparatus and is positionable in a plurality of orientations via the steering interface on the steering end of the insertion apparatus. The method further includes positioning the insertion end of the service apparatus proximate at least one blade of the plurality of blades by transitioning the service apparatus from a first orientation to a second orientation. The first orientation facilitates positioning the service apparatus relative to adjacent vanes of the plurality of vanes. The second orientation facilitates positioning the service apparatus relative to adjacent blades. The method also includes releasably coupling the service apparatus to the at least one blade of the plurality of blades in the second orientation using the anchoring feature on the service apparatus. The method further includes positioning the service apparatus adjacent a portion of the turbine assembly using the rotor to rotate the service apparatus about an axis of rotation of the rotor. The method also includes executing a maintenance operation on a portion of the turbine assembly, said maintenance operation including at least one of inspection, cleaning, and repair of a portion of the turbine assembly.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments described herein provide an insertion apparatus and service apparatus for use with rotary machines. The insertion apparatus is configured to position the service apparatus precisely within a primary flowpath of the machine. For example, the insertion apparatus extends through a port of a turbine assembly and positions the service apparatus adjacent a rotating component of the turbine assembly. During deployment, the service apparatus is proximate to an insertion end of the insertion apparatus such that the service apparatus is positionable relative to the rotary machine using a steering interface on the steering end of the insertion apparatus. As a result, the insertion apparatus facilitates positioning the service apparatus proximate the rotor, such as between adjacent blades, and thus facilitates access of the service apparatus to locations within the primary flowpath of the machine.

Figure 1:
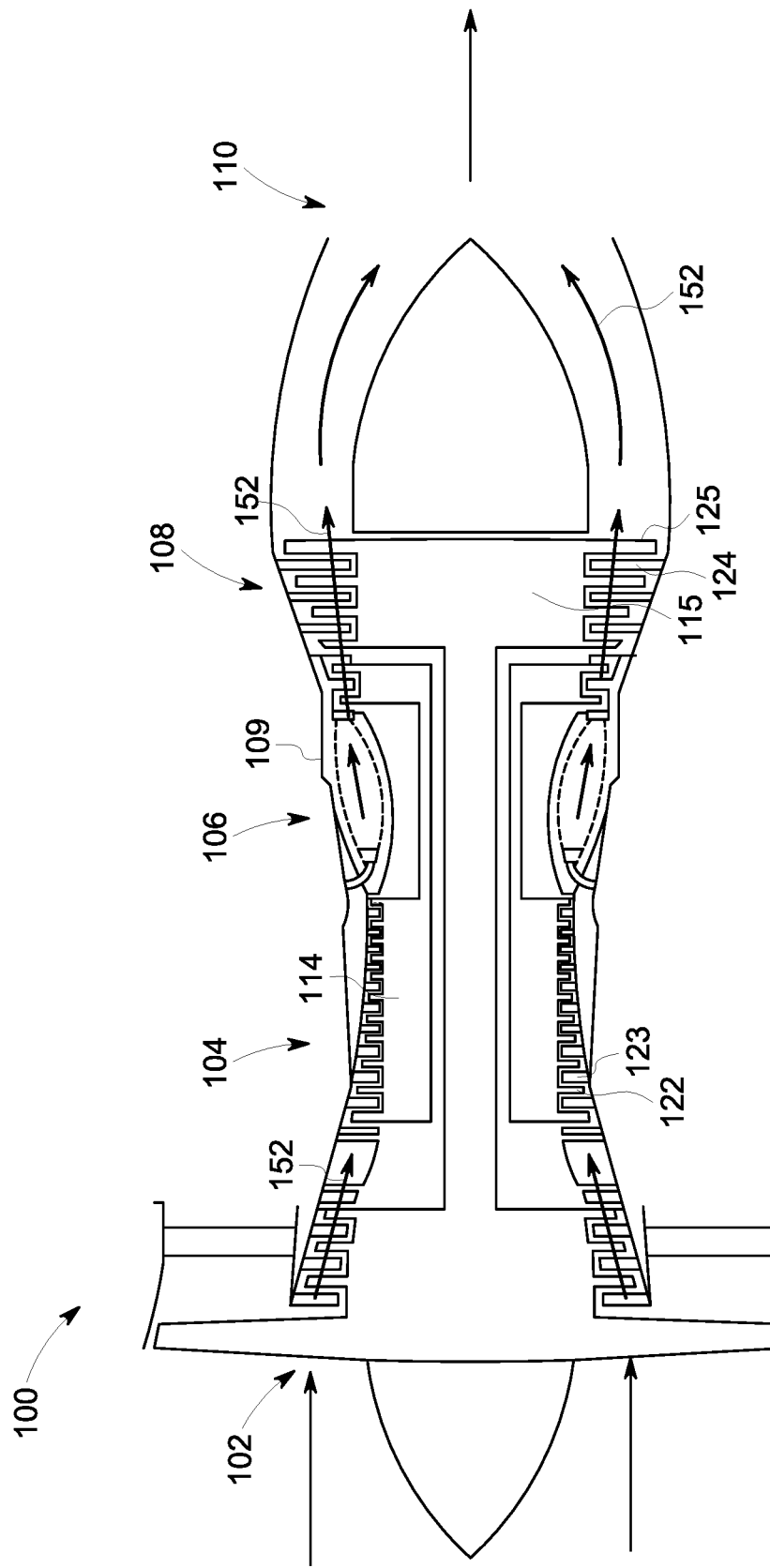
FIG. 1 is a cross-sectional schematic view of an exemplary rotary machine.

FIG. 1 is a cross-sectional schematic view of an exemplary rotary machine. In the exemplary embodiment, the rotary machine includes a turbine assembly 100. In alternative embodiments, the rotary machine includes any assembly. For example, in some embodiments, the rotary machine includes, without limitation, any of the following: a compressor, a blower, a pump, a turbine, a motor, and a generator.

In the exemplary embodiment, turbine assembly 100 includes an inlet 102, a compressor 104, a combustor 106, a turbine 108, an outer case 109, and an exhaust 110. Fluid flows from inlet 102, through compressor 104, through combustor 106, through turbine 108 and is discharged through exhaust 110. Also, in the exemplary embodiment, compressor 104 and turbine 108 include airfoils configured to direct fluid through turbine assembly 100. In particular, compressor 104 and turbine 108 include blades 122, 125 and guide vanes 123, 124. Together, blades 122, 125, guide vanes 123, 124, and shrouds 113 (shown in FIG. 2) define a primary flowpath 152 of turbine assembly 100. This flowpath, combined with a flowpath through combustor 106, defines a primary cavity within turbine assembly 100. In alternative embodiments, turbine assembly 100 is configured in any manner that enables turbine assembly 100 to operate as described herein.

Blades 122, 125 are operably coupled with rotating shafts 114, 115 such that blades 122, 125 rotate when rotating shafts 114, 115 rotate. Accordingly, blades 122, 125 and rotating shafts 114, 115 form a rotor of turbine assembly 100. Guide vanes 123, 124 and shrouds 113 are stationary components and are coupled to an interior surface 121 of outer case 109. Blades 122, 125 and guide vanes 123, 124 are generally positioned alternatingly along the rotor axis within turbine assembly 100. In alternative embodiments, compressor 104 and/or turbine 108 includes any airfoils that enable turbine assembly 100 to operate as described herein.

Figure 2:
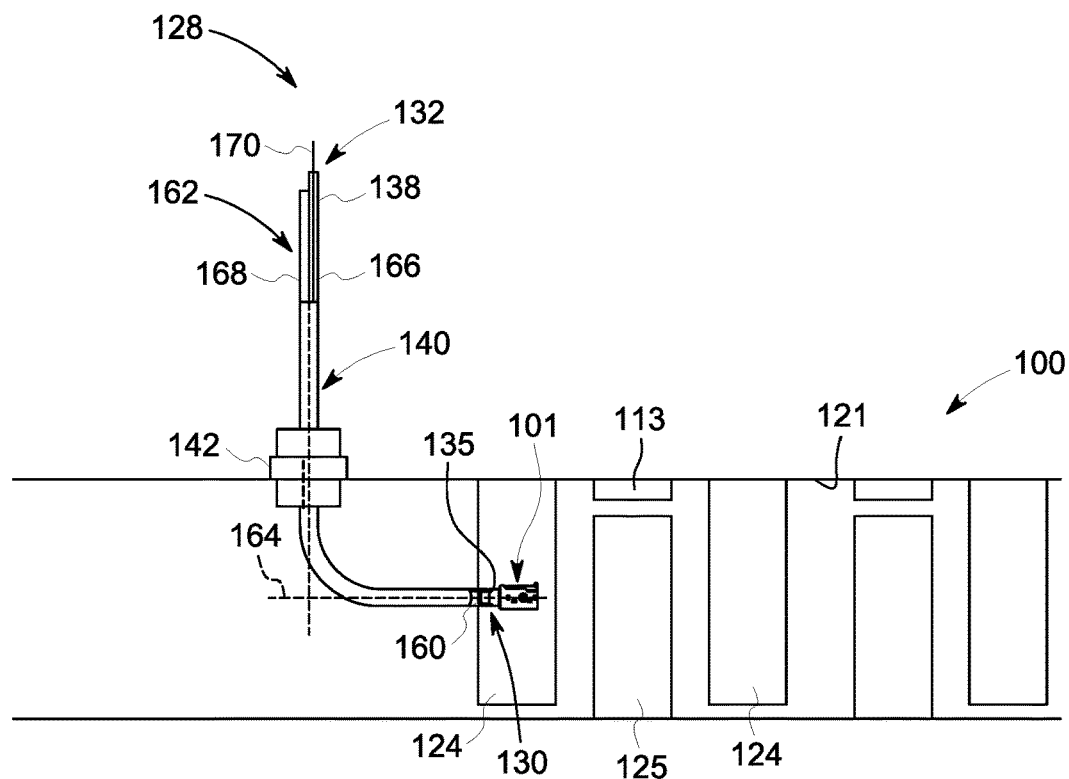
FIG. 2 is a schematic view of a service apparatus positioned within a primary flowpath of the rotary machine shown in FIG. 1 using an insertion apparatus.
Figure 3:
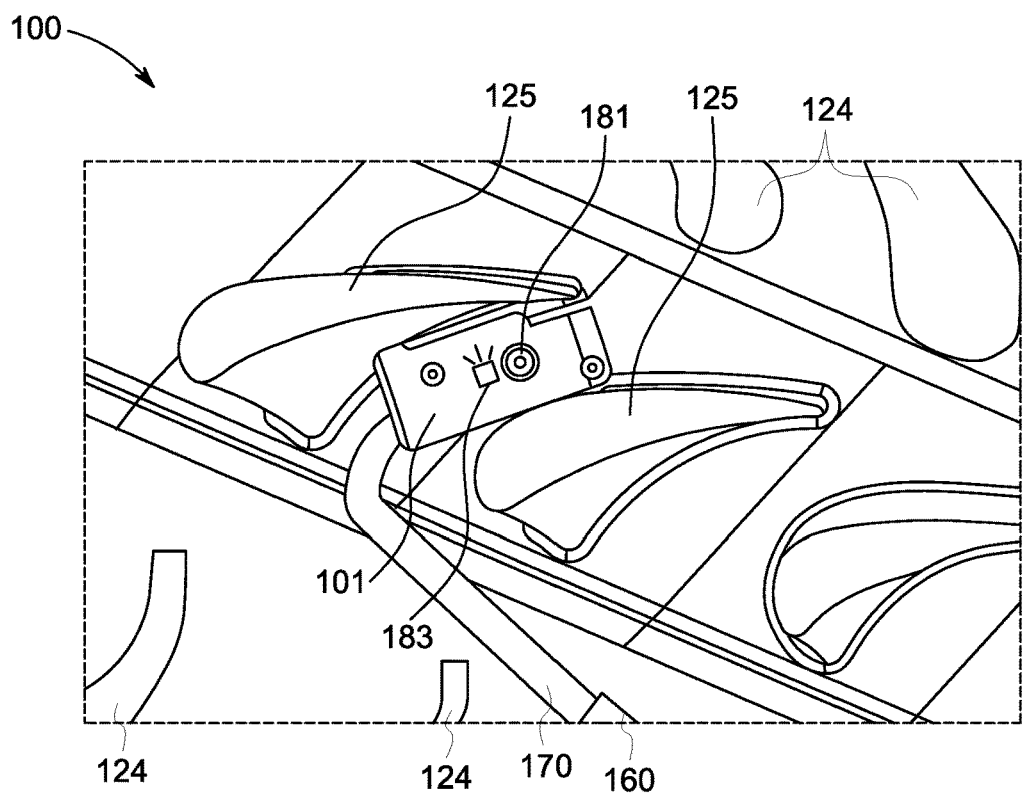
FIG. 3 is a schematic view of the service apparatus shown in FIG. 2 positioned between adjacent blade airfoils on the rotor of the rotary machine shown in FIG. 1.

FIG. 2 is a schematic view of an insertion apparatus 128 and service apparatus 101 positioned in the primary cavity of turbine assembly 100. FIG. 3 is a schematic view of service apparatus 101 positioned between adjacent blades 125 of turbine assembly 100. In addition, in the exemplary embodiment, service apparatus 101 is configured to move through the primary flowpath of turbine assembly 100. Accordingly, service apparatus 101 facilitates maintenance of turbine assembly 100. For example, service apparatus 101 facilitates inspection and repair of turbine assembly 100 at locations within the primary flowpath that are difficult to access from an exterior of turbine assembly 100 by conventional means, such as using a borescope tool. Service apparatus 101 is positioned within the primary flowpath using insertion apparatus 128. In some embodiments, insertion apparatus 128 is used to position service apparatus 101 adjacent rotating components of turbine assembly 100, such as blades 122, 125, and the rotating components are subsequently used to position service apparatus 101 relative to stationary components of turbine assembly 100.

During operation, service apparatus 101 enters turbine assembly 100 through any suitable access port or opening of turbine assembly 100. For example, in some embodiments, service apparatus 101 enters and/or exits turbine assembly 100 through any of inlet 102, exhaust 110, and/or an access port, such as an igniter, borescope, or fuel nozzle port. In the exemplary embodiment, service apparatus 101 is sized and shaped to fit within turbine assembly 100 and to travel through turbine assembly 100, such as through the primary cavity of turbine assembly 100. For example, service apparatus 101 has a height, length, and width that are less than a clearance required to fit within the primary flowpath. The height, length, and width define a volume of service apparatus 101. In alternative embodiments, service apparatus 101 is any size and shape that enables service apparatus 101 to operate as described herein.

During operation, service apparatus 101 could be used to inspect and/or repair any interior components of turbine assembly 100. For example, in some embodiments, service apparatus 101 is positioned adjacent a portion of interior surface 121 of turbine assembly 100. Interior surface 121 is any surface within the primary flowpath of turbine assembly 100. For example, in some embodiments, interior surface 121 includes, without limitation, surfaces of blades 122, 125, guide vanes 123, 124, and shrouds 113. In some embodiments, service apparatus 101 detects a characteristic of interior surface 121. For example, in some embodiments, service apparatus 101 is used to generate an image of interior surface 121 and the image is examined to determine the condition of turbine assembly 100 and assess whether repairs are necessary. If repairs are necessary, in some embodiments, service apparatus 101 is used to repair interior surface 121. For example, in some embodiments, service apparatus 101 removes and/or replaces a damaged portion of interior surface 121. After inspection and/or repair of interior surface 121, service apparatus 101 exits turbine assembly 100 through any suitable access port or opening of turbine assembly 100, such as via the route of entry.

Insertion apparatus 128 includes an insertion end 130 and a steering end 132 opposite insertion end 130. Insertion end 130 is positionable within the primary flowpath of turbine assembly 100, such as adjacent blades 122, 125. In addition, service apparatus 101 is coupled to insertion end 130 of insertion apparatus 128 and is positionable in a plurality of orientations using a steering interface on steering end 132 of insertion apparatus 128. For example, in some embodiments, service apparatus 101 is pivoted between a first orientation (shown in FIG. 8) in which service apparatus 101 is aligned with a translation direction 164 and a second orientation (shown in FIG. 9) in which service apparatus 101 extends at an angle relative to translation direction 164 so as to facilitate anchoring to at least one blade 122, 125. The ability to position service apparatus 101 in a plurality of orientations facilitates insertion of service apparatus 101 to the target location within the primary flowpath and allows service apparatus 101 to anchor onto the rotor and perform service operations at otherwise difficult to access locations. In alternative embodiments, service apparatus 101 is positionable in any orientation that enables service apparatus 101 to operate as described herein.

In addition, in the exemplary embodiment, a steering interface 138 is located at steering end 132 of insertion apparatus 128 and is configured to steer service apparatus 101 via insertion end 130. In some embodiments, steering interface 138 includes one or more actuator members (such as elastic sheets driving kinematic linkages). For example, a user may hold and manipulate steering end 132. In further embodiments, steering is at least partially automated. In alternative embodiments, insertion apparatus 128 includes any steering interface 138 that enables insertion apparatus 128 to operate as described herein.

Also, in the exemplary embodiment, a guide apparatus 140 extends through a port of turbine assembly 100 and defines a path for insertion apparatus 128. For example, guide apparatus 140 includes a curved guide tube that is sized to receive insertion apparatus 128 within its interior space. Guide apparatus 140 may be fixed to turbine assembly 100 by a flange 142 coupled to a port of turbine assembly 100. For example, flange 142 extends around guide apparatus 140 and is sized to fit onto a borescope or an igniter port of turbine assembly 100. In alternative embodiments, guide apparatus 140 is coupled to turbine assembly 100 in any manner that enables guide apparatus 140 to operate as described herein.

In addition, in the exemplary embodiment, guide apparatus 140 is configured to direct insertion apparatus 128 within the primary cavity of turbine assembly 100. For example, guide apparatus 140 is curved and defines a curved path for insertion apparatus 128. In addition, guide apparatus 140 is sized such that an insertion end 160 of guide apparatus 140 is positioned proximate a target area within turbine assembly 100. For example, in some embodiments, guide apparatus 140 positions insertion end 130 of insertion apparatus 128 between adjacent vanes 123, 124 and, using steering interface 138, advances insertion end 130 proximate a rotating component of turbine assembly 100, such as proximate blades 122, 125, thus facilitating anchoring service apparatus 101 between adjacent blades 122, 125. In alternative embodiments, guide apparatus 140 is any size and shape that enables guide apparatus 140 to operate as described herein.

As a result, insertion apparatus 128 allows precise positioning of service apparatus 101 within the primary flowpath of turbine assembly 100. For example, in some embodiments, insertion apparatus 128 is used to position service apparatus 101 proximate blades 122, 125 of turbine assembly 100. In some embodiments, service apparatus 101 is anchored to a portion of turbine assembly 100. In addition, in some embodiments, a rotating component of turbine assembly 100 is used to position service apparatus 101 proximate a stationary component of turbine assembly 100 that is difficult to access by conventional means. Accordingly, service apparatus 101 is positioned to perform service operations at difficult-to-access locations within turbine assembly 100.

Figure 4:
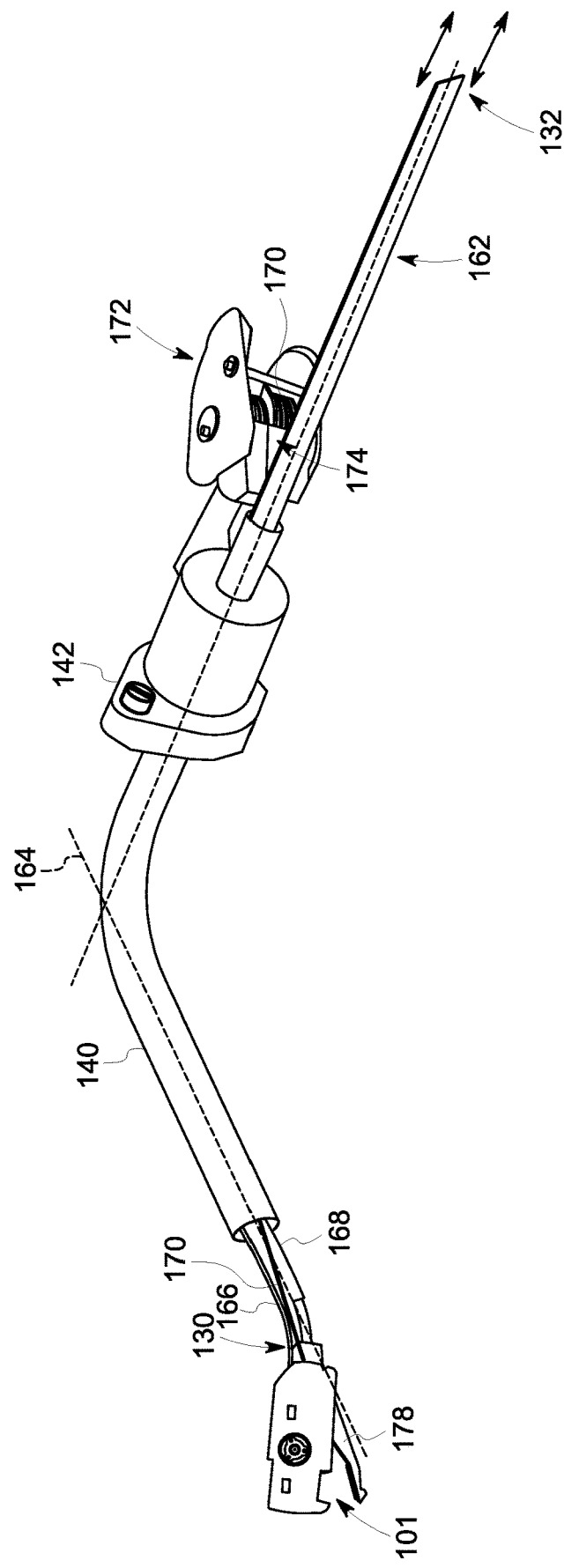
FIG. 4 is a perspective view of the insertion apparatus and service apparatus shown in FIG. 2.
Figure 5:
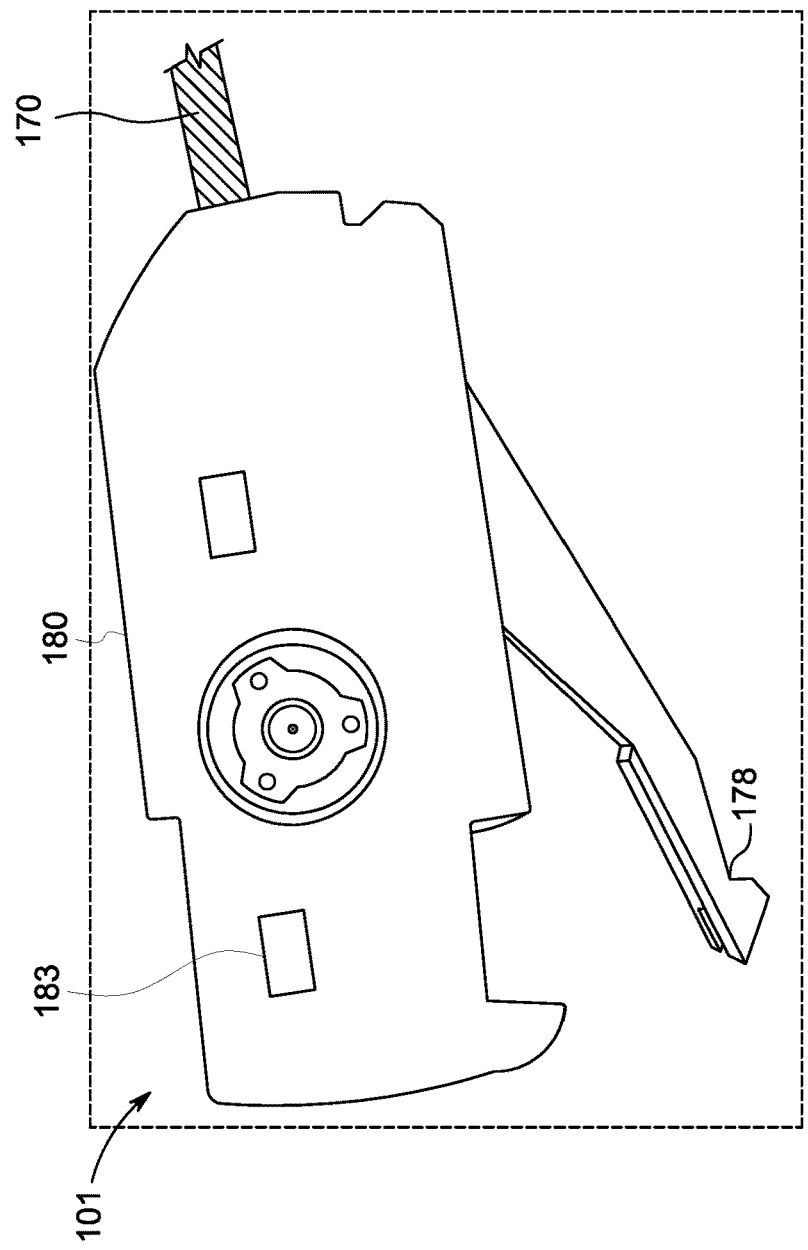
FIG. 5 is a side view of the service apparatus shown in FIGS. 3 and 4.

FIG. 4 is a perspective view of insertion apparatus 128 and service apparatus 101. FIG. 5 is a side view of service apparatus 101. In the exemplary embodiment, insertion apparatus 128 includes a body 162 extending from steering end 132 to insertion end 130 Body 162 includes a first elastic sheet 166 and a second elastic sheet 168. Accordingly, insertion end 130 is steerable by moving, using steering interface 138 (shown in FIG. 2), first elastic sheet 166 and second elastic sheet 168 in opposing directions. In some embodiments, first elastic sheet 166 and second elastic sheet 168 are flexible and bend elastically in a plane extending along the insertion path. At the same time, first elastic sheet 166 and second elastic sheet 168 are relatively rigid in the plane of the sheets to allow transmission of the steering forces along the axis of the body 162. For example, in some embodiments, first elastic sheet 166 and second elastic sheet 168 include elastically deformable sheets, such as fiberglass, spring steel, or any material that allows the first elastic sheet 166 and second elastic sheet 168 to elastically bend through the guide apparatus 140 in the translation direction while providing sufficient stiffness to allow forward forces on the steering interface 138 (shown in FIG. 2) to advance insertion end 130, and hence service apparatus 101, along the translation direction. In alternative embodiments, insertion apparatus 128 includes any body 162 that enables insertion apparatus 128 to operate as described herein. For example, in some embodiments, body 162 includes a torsionally stiff tube or semi-rigid member that is compliant in bending and extends from insertion end 130 to steering end 132.

Figure 8:
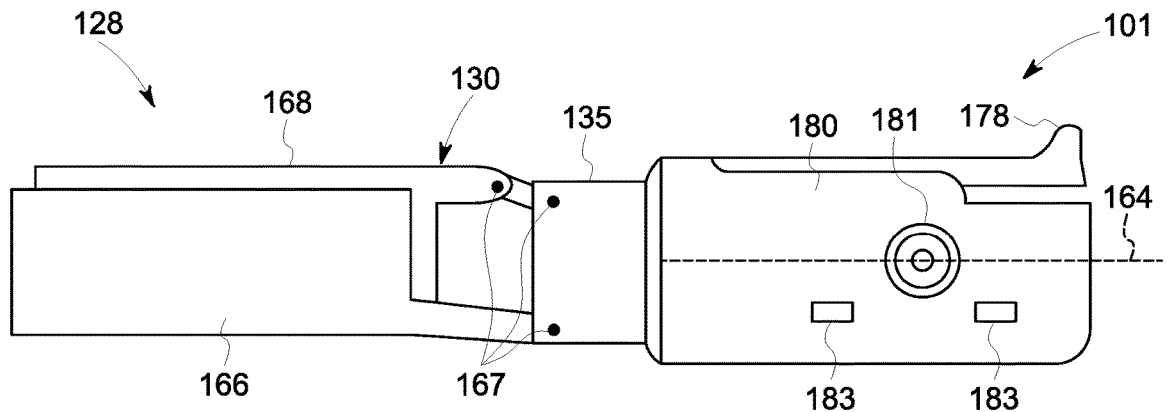
FIG. 8 is a top view of the service apparatus shown in FIGS. 3-5 in a first orientation.

With reference to FIG. 8, also, in the exemplary embodiment, insertion apparatus 128 includes a latching mechanism 135 that releasably couples service apparatus 101 to insertion end 130. In some embodiments, service apparatus 101 and/or insertion apparatus 128 include magnets, hooks, latches, adhesives, and any other engagement mechanism that enables insertion apparatus 128 to operate as described herein. In addition, in some embodiments, insertion apparatus 128 includes an actuator that is actuated from steering end 132 and causes latching mechanism 135 to disengage from service apparatus 101. In the exemplary embodiment, insertion apparatus 128 includes a plurality of linkages 167 that facilitate pivoting of service apparatus 101 relative to blades 125 (shown in FIG. 3). Linkages 167 may be located on insertion end 130 of body 162 (shown in FIG. 4) and/or on latching mechanism 135. In alternative embodiments, service apparatus 101 is coupled to insertion apparatus 128 in any manner that enables service apparatus 101 and insertion apparatus 128 to operate as described herein.

In addition, in the exemplary embodiment, a component, such as a harness or tether 170, extends from service apparatus 101 to the exterior of turbine assembly 100. For example, tether 170 provides power to service apparatus 101, allows service apparatus 101 to send and/or receive signals, and/or transmits mechanical force, fluids, or thermal energy to service apparatus 101. Insertion apparatus 128 includes a tensioning mechanism 172 configured to control the tension of tether 170. For example, tensioning mechanism 172 prevents slack in tether 170 which could cause service apparatus 101 to be moved out of a desired position and/or hinder removal of service apparatus 101 from the primary flowpath. In the exemplary embodiment, tensioning mechanism 172 includes a constant-force tensioning spring system with a reel 174. Tether 170 is wound around reel 174 of tensioning mechanism 172. Reel 174 maintains tension on tether 170. When a sufficient force pulls tether 170, tether 170 unwinds from reel 174. Accordingly, tensioning mechanism 172 maintains a desired tension in tether 170. In alternative embodiments, service apparatus 101 includes any tether 170 and/or tensioning mechanism 172 that enables service apparatus 101 to operate as described herein. In some embodiments, tensioning mechanism 172 employs an active tensioner, such as a motorized tensioner with closed-loop feedback control to maintain tension within the desired range. In other embodiments, tensioning mechanism 172 is not required. In still other embodiments, tension on tether 170 is maintained manually by the operator.

Moreover, in the exemplary embodiment, service apparatus 101 is sized to fit adjacent a rotating component within the primary flowpath of turbine assembly 100. For example, service apparatus 101 is positioned, using insertion apparatus 128, within the primary flowpath of turbine assembly 100 between adjacent blades 125. In addition, service apparatus 101 is configured to anchor, using an anchoring feature 178 (shown in FIG. 5), to turbine assembly 100 to facilitate positioning service apparatus 101 adjacent a portion of turbine assembly 100 using a rotating component of turbine assembly 100. Anchoring feature 178 can be an actuated feature, such as a spring-loaded arm that engages features in blades 125 and is actuated from steering end 132. Alternatively, anchoring feature 178 can be a geometrical feature, such as a notch, that allows interlocking with the rotor, such as with blade 125, while tension is applied to tether 170. The rotating component of turbine assembly 100 is then used to position service apparatus 101 relative to stationary components of turbine assembly 100. In alternative embodiments, service apparatus 101 is positioned in any manner that enables service apparatus 101 to operate as described herein.

Also, in the exemplary embodiment, service apparatus 101 includes at least one maintenance device 180 to allow service apparatus 101 to perform an inspection and/or repair operation within the primary flowpath of turbine assembly 100. In some embodiments, maintenance device 180 includes a camera 181 and an illuminator 183 (shown in FIG. 3). Illuminator 183 may comprise a light-emitting diode (LED). In alternative embodiments, service apparatus 101 includes any maintenance device that enables service apparatus 101 to operate as described herein. For example, in some embodiments, maintenance device 180 of service apparatus 101 includes, without limitation, any of the following: an applicator, a drill, a grinder, a heater, a welding electrode, a sprayer, an optical sensor (e.g., visible, infrared, and/or multi-spectral sensor), a mechanical sensor (e.g., stylus profilometer, coordinate measurement probe, load transducer, linear variable differential transformer), a thermal sensor (e.g., pyrometer, thermocouple, resistance temperature detector), a magnetic sensor, an acoustic sensor (e.g., piezoelectric, microphone, ultrasound), and an electromagnetic sensor (e.g., eddy current, potential drop, x-ray).

Figure 6:
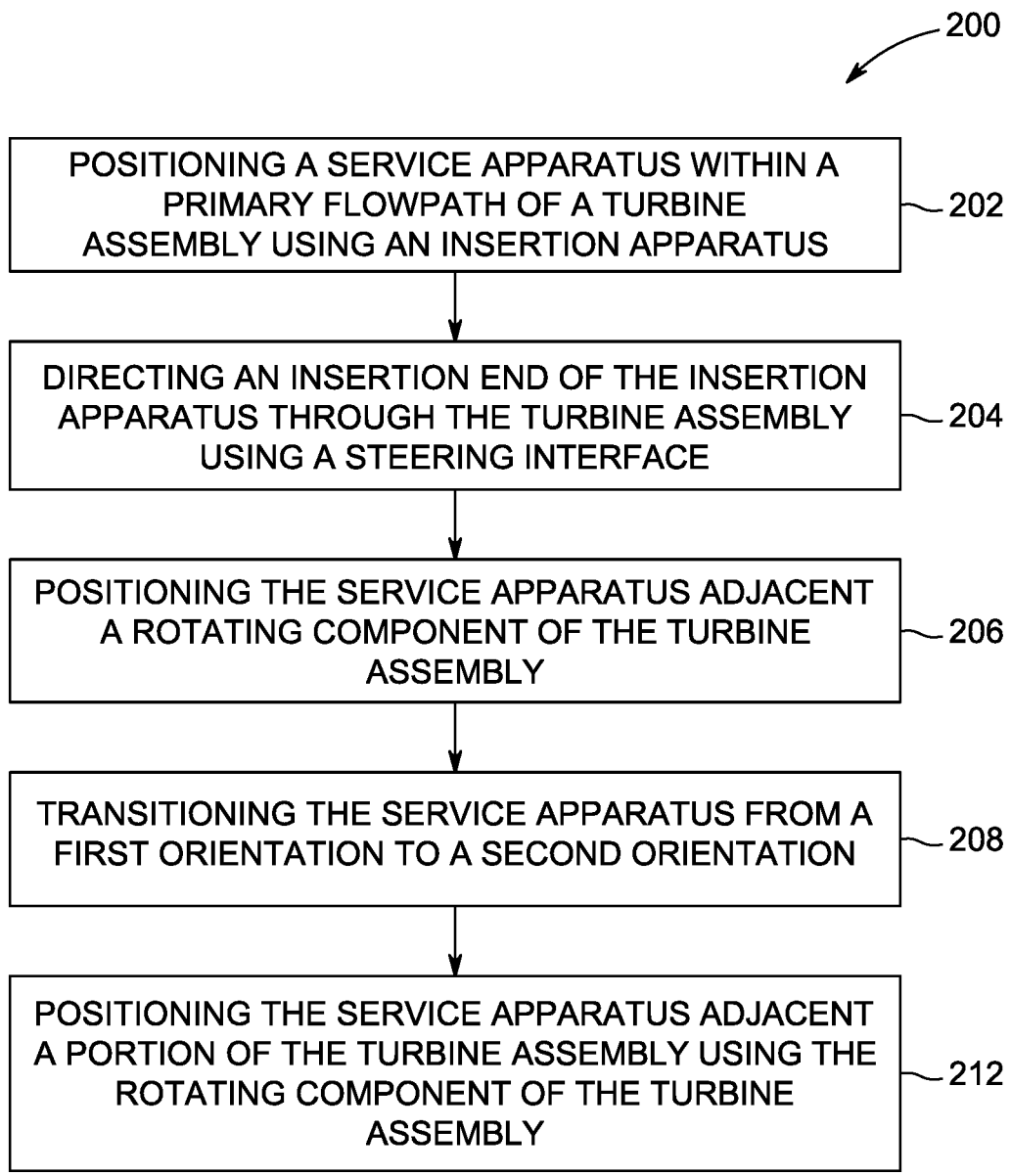
FIG. 6 is a flow chart of an exemplary method of positioning and operating a service apparatus.

FIG. 6 is a flow chart of an exemplary method 200 of operating service apparatus 101. In reference to FIGS. 1-5, method 200 includes positioning 202 service apparatus 101 within a primary flowpath of turbine assembly 100 using insertion apparatus 128. Service apparatus 101 is coupled to insertion end 130 of insertion apparatus 128. Service apparatus 101 is positioned 202 within the primary flowpath of turbine assembly 100 by inserting insertion apparatus 128 and service apparatus 101 through any suitable opening or port of turbine assembly 100. For example, in some embodiments, insertion apparatus 128 is inserted through an igniter port and positioned within a primary cavity of combustor 106. Guide apparatus 140 facilitates positioning insertion apparatus 128 and service apparatus 101 within the primary flowpath. In alternative embodiments, service apparatus 101 is positioned 202 within the primary flowpath of turbine assembly 100 in any manner that enables service apparatus 101 to operate as described herein.

Also, in the exemplary embodiment, method 200 includes directing 204 insertion end 130 of insertion apparatus 128 through turbine assembly 100 using steering interface 138, which is configured to move insertion end 130 relative to turbine assembly 100. In some embodiments, insertion end 130 is directed by moving body 162 along translation direction 164. In the exemplary embodiment, insertion end 130 is directed by moving first elastic sheet 166 and second elastic sheet 168 in the same direction along translation direction 164. In some embodiments, translation direction 164 includes at least one bend such that insertion end 130 extends along an axis that is at an angle relative to an axis through steering end 132. For example, in the embodiment shown in FIG. 4, an axis extends through insertion end 130 and an angle of about 90° relative to the axis through steering end 132. In alternative embodiments, insertion apparatus 128 is moved in any manner that enables insertion apparatus 128 to operate as described herein.

Figure 9:
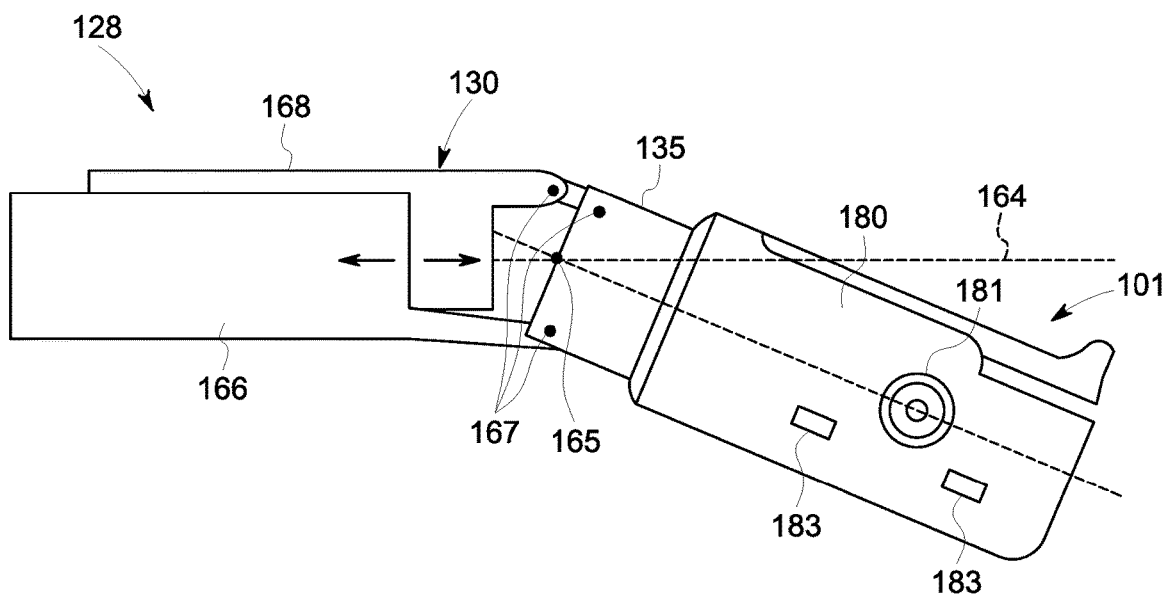
FIG. 9 is a top view of the service apparatus shown in FIGS. 3-5 and 8 in a second orientation.

Moreover, in the exemplary embodiment, method 200 includes positioning 206, via insertion end 130 of insertion apparatus 128, service apparatus 101 adjacent a rotating component of turbine assembly 100. In addition, method 200 includes transitioning 208 service apparatus 101 from a first orientation (e.g., as shown in FIG. 8) to a second orientation (e.g., as shown in FIG. 9) using steering interface 138. Specifically, in the exemplary embodiment, service apparatus 101 is pivoted about an axis perpendicular to translation direction 164 between the first and second orientations by moving first elastic sheet 166 and second elastic sheet 168 relative to each other along translation direction 164. In the first orientation, service apparatus 101 extends along translation direction 164 so as to facilitate directing service apparatus 101 through vanes 123, 124. In the second orientation, service apparatus 101 extends at an angle relative to translation direction 164 so as to position service apparatus 101 adjacent blades 122, 125.

In addition, in the exemplary embodiment, method 200 includes positioning 212 service apparatus 101 adjacent a portion of turbine assembly 100 using the rotating component of turbine assembly 100. In some embodiments, service apparatus 101 is anchored to a rotating component of turbine assembly 100 and positioned proximate a non-rotating portion of turbine assembly 100 using the rotating component of turbine assembly 100. That is, the rotating component is rotated to a desired location and service apparatus 101 performs a service operation at the desired location. During rotation, tensioning mechanism 172 is used to control the tension in tether 170. After the service operation is complete, the rotating component is returned to the insertion location for retrieval of service apparatus 101.

In some embodiments, method 200 includes inserting guide apparatus 140 through a port of turbine assembly 100 to define a path for insertion apparatus 128. For example, in some embodiments, guide apparatus 140 is inserted through an ignitor port of turbine assembly 100 to define a path for insertion apparatus 128. Flange 142 fits onto the ignitor port and couples guide apparatus 140 to turbine assembly 100. In alternative embodiments, insertion apparatus 128 is inserted into the primary flowpath of turbine assembly 100 in any manner that enables insertion apparatus 128 to operate as described herein.

Figure 7:
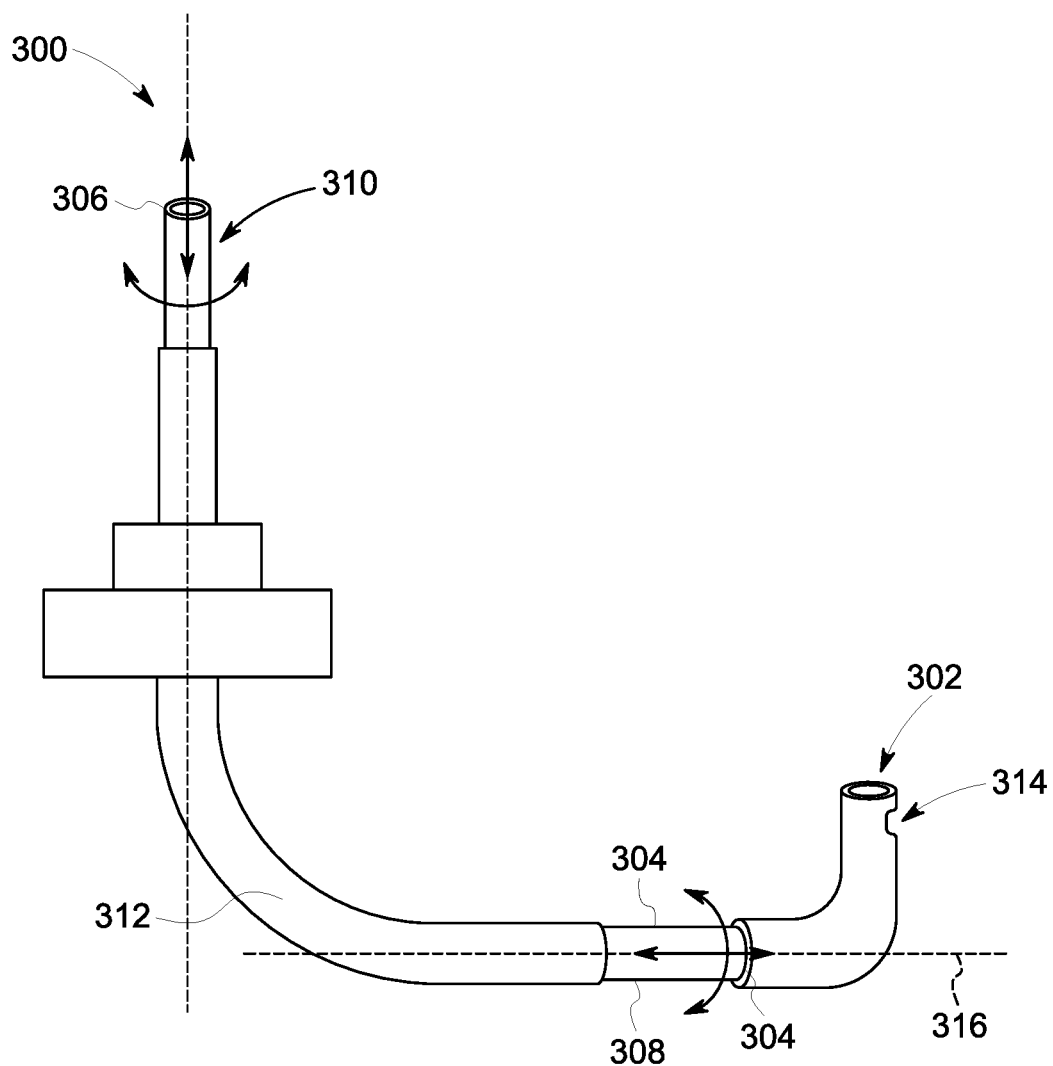
FIG. 7 is a perspective view of an alternative embodiment of a service apparatus and a portion of an insertion apparatus for use with the rotary machine shown in FIG. 1.

FIG. 7 is a schematic view of an alternative embodiment of an insertion apparatus 300 and a service apparatus 302 for use with turbine assembly 100 (shown in FIG. 1). Insertion apparatus 300 includes an insertion end 304, a steering end 306 opposite insertion end 304, a body 308, and a steering interface 310. Insertion apparatus 300 is positionable within a primary flow path using a guide apparatus 312. Body 308 extends from insertion end 304 to steering end 306. Body 308 has a generally cylindrical shape and is elastically deformable in bending so as to change direction through guide apparatus 312. Service apparatus 302 is coupled to insertion end 304 of insertion apparatus 300 so that rotation and translation of steering end 304 translate into rotation and translation on service apparatus 302. Service apparatus also includes at least one anchoring feature 314 that facilitates maintaining position of service apparatus 302 relative to blades 122, 125 during rotation of rotating shafts 115 and performance of maintenance operations. In alternative embodiments, insertion apparatus 300 includes any body 308 and/or any guide tube that enables insertion apparatus 300 to operate as described herein.

In the exemplary embodiment, steering interface 310 is located at steering end 306 of insertion apparatus 300 and is configured to steer insertion end 304, and hence service apparatus 302, relative to turbine assembly 100 (shown in FIG. 1). Insertion end 304 and service apparatus 302 are steerable by moving, using steering interface 310, body 308. In alternative embodiments, insertion apparatus 128 includes any steering interface 138 that enables insertion apparatus 128 to operate as described herein.

The above described embodiments provide an insertion apparatus and service apparatus for use with rotary machines. The insertion apparatus is configured to position the service apparatus within a primary flowpath of the machine. For example, the insertion apparatus extends through a port of a turbine assembly and positions the service apparatus adjacent a rotating component of the turbine assembly using a steering interface. The service apparatus is releasably or rigidly coupleable to an insertion end of the insertion apparatus such that the service apparatus is positionable relative to the insertion apparatus. As a result, the insertion apparatus facilitates the service apparatus fitting between blades of the rotating component and provides access to locations within the primary flowpath of the machine.

An exemplary technical effect of the methods, systems, and apparatus described herein includes at least one of: (a) reducing the time to inspect and/or repair rotary machines; (b) increasing the accessibility of difficult-to-reach locations within a turbine assembly for inspection and/or in situ repair; (c) reducing the time that rotary machines are out of service for maintenance; (e) increasing the precision and/or reliability of inspection and repair of rotary machines; (f) reducing unplanned service outages for a rotary machine; and (g) enhancing data capture for use in quantifying and/or modeling the service condition of at least some components of the rotary machine.

Exemplary embodiments of methods and systems for use in maintaining rotary machines are not limited to the specific embodiments described herein, but rather, components of systems and/or steps of the methods may be utilized independently and separately from other components and/or steps described herein. For example, the methods and systems may also be used in combination with other systems requiring inspection and/or repair of components, and are not limited to practice with only the systems and methods as described herein. Rather, the exemplary embodiment can be implemented and utilized in connection with many other applications, equipment, and systems that may benefit from using a service apparatus for inspection and/or repair.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for use in maintaining a turbine assembly, the turbine assembly including a plurality of blades and a plurality of vanes, said system comprising:
   an insertion apparatus comprising an insertion end, a steering end opposite said insertion end, and a body extending from said insertion end to said steering end, wherein said insertion end is positionable proximate to at least one blade of the plurality of blades using a steering interface;

a service apparatus for use in maintaining the turbine assembly, said service apparatus including at least one maintenance device and an anchoring feature, wherein said service apparatus is proximate said insertion end of said insertion apparatus and is positionable in a plurality of orientations via said steering interface, and wherein said anchoring feature is configured to releasably couple said service apparatus to at least one blade of the plurality of blades; and a guide apparatus configured to extend through a port of the turbine assembly and define a path for said insertion apparatus, wherein said body includes a first elastic sheet and a second elastic sheet, and wherein said first elastic sheet and said second elastic sheet extend from said steering end to said insertion end along a translation direction defined by said guide apparatus, wherein said steering interface is coupled to said first elastic sheet and to said second elastic sheet at said steering end of said insertion apparatus.

2. The system in accordance with claim 1, wherein said guide apparatus comprises a curved tube.

3. The system in accordance with claim 1, wherein said guide apparatus comprises a flange coupleable to a port of the turbine assembly to support said guide apparatus when said guide apparatus extends through the port.

4. The system in accordance with claim 1, wherein said at least one maintenance device comprises at least one of the following: an applicator, a drill, a grinder, a heater, a welding electrode, a sprayer, an optical sensor, a mechanical sensor, a thermal sensor, a magnetic sensor, an acoustic sensor, and an electromagnetic sensor.

5. The system in accordance with claim 1, wherein said steering interface is coupled to said steering end of said insertion apparatus, wherein said insertion end is positionable using the steering interface by moving said body along and/or about a translation direction.

6. The system in accordance with claim 1, wherein said insertion end is positionable along the translation direction by moving said first elastic sheet and said second elastic sheet along the translation direction, and wherein said insertion end is rotatable about a direction perpendicular to the translation direction by moving said first elastic sheet and said second elastic sheet relative to one another.

7. The system in accordance with claim 1, wherein said body includes a generally cylindrical shape compliant in bending and extending from said steering end to said insertion end along a translation direction defined by said guide apparatus, wherein the steering interface is located at said steering end of said insertion apparatus and configured to steer said insertion end relative to the turbine assembly by translating said body along the guide apparatus direction and rotating said body about the guide apparatus direction.

8. The system in accordance with claim 1, further comprising a tether extending from said service apparatus to said insertion end of said insertion apparatus and a tensioning mechanism configured to control tension in said tether when said service apparatus is positioned within a primary flowpath of the turbine assembly.

9. The system in accordance with claim 1, wherein said service apparatus is sized to fit between adjacent blades of the turbine assembly.

10. The system in accordance with claim 1, wherein said service apparatus is releasably coupleable to said insertion end of said insertion apparatus.

11. The system in accordance with claim 1, wherein said insertion apparatus further includes a plurality of linkages that facilitate pivoting of said service apparatus.

12. A method of operating a service apparatus for use with a turbine assembly, the turbine assembly including a plurality of vanes and a rotor having a plurality of blades, said method comprising:

inserting a guide apparatus through a port of the turbine assembly to define a path for an insertion apparatus;

positioning the service apparatus within a primary flowpath of the turbine assembly using the insertion apparatus, the insertion apparatus including an insertion end, a steering end opposite the insertion end, and a body extending from the insertion end to the steering end, the service apparatus including at least one maintenance device and an anchoring feature configured to releasably couple said service apparatus to at least one blade of the plurality of blades, wherein said body includes a first elastic sheet and a second elastic sheet, and wherein said first elastic sheet and said second elastic sheet extend from said steering end to said insertion end along a translation direction defined by said guide apparatus, wherein said steering interface is coupled to said first elastic sheet and to said second elastic sheet at said steering end of said insertion apparatus;

directing the insertion end of the insertion apparatus through the turbine assembly using a steering interface on the steering end of the insertion apparatus, wherein the service apparatus is coupled to the insertion end of the insertion apparatus and is positionable in a plurality of orientations via the steering interface on the steering end of the insertion apparatus;

positioning the insertion end of the service apparatus proximate at least one blade of the plurality of blades by transitioning the service apparatus from a first orientation to a second orientation, wherein the first orientation facilitates positioning the service apparatus relative to adjacent vanes of the plurality of vanes and the second orientation facilitates positioning the service apparatus relative to adjacent blades;

releasably coupling the service apparatus to the at least one blade of the plurality of blades in the second orientation using the anchoring feature on the service apparatus;

positioning the service apparatus adjacent a portion of the turbine assembly using the rotor to rotate the service apparatus about an axis of rotation of the rotor; and executing a maintenance operation on a portion of the turbine assembly, said maintenance operation including at least one of inspection, cleaning, and repair of a portion of the turbine assembly.

13. The method in accordance with claim 12, wherein inserting a guide apparatus through a port comprises inserting a curved tube through the port, the curved tube defining a path for the insertion apparatus and coupling said guide apparatus to the turbine assembly via an integral flange positioned onto the port of the turbine assembly.

14. The method in accordance with claim 12, further comprising detecting a characteristic of an interior portion of the turbine assembly defining the primary flowpath using the service apparatus.

15. The method in accordance with claim 12, wherein directing the insertion end of the insertion apparatus comprises moving the body along said guide apparatus and transitioning the service apparatus from a first orientation in which the service apparatus is aligned with a translation direction and a second orientation in which the service apparatus extends at an angle relative to the translation direction.

16. The method in accordance with claim 12, wherein directing the insertion end of the insertion apparatus comprises moving the first elastic sheet and the second elastic sheet in the same direction along the guide apparatus and wherein transitioning the service apparatus from a first orientation to a second orientation comprises moving the first elastic sheet and the second elastic sheet relative to each other along the guide apparatus direction.

17. The method in accordance with claim 12, further comprising controlling tension in a tether coupled to the service apparatus using a tensioning mechanism, wherein the tether is configured to extend from the service apparatus to an exterior of the turbine assembly when said service apparatus is positioned within the primary flowpath of the turbine assembly.

18. The method in accordance with claim 12, further comprising repairing an interior portion of the turbine assembly defining the primary flowpath using the service apparatus.

* * * * *